(12) United States Patent
Schoeffler et al.

(10) Patent No.: US 12,169,478 B2
(45) Date of Patent: *Dec. 17, 2024

(54) SAVING FILES FROM THIRD-PARTY SYSTEMS DIRECTLY TO A CLOUD STORAGE SYSTEM

(71) Applicant: Google LLC, Mountain View, CA (US)

(72) Inventors: Eric Benson Schoeffler, Boulder, CO (US); Peyman Nayeri, Boulder, CO (US); Brian Lewis Cairns, Boulder, CO (US); Michael Jeffrey Procopio, Boulder, CO (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,959

(22) Filed: Jan. 9, 2023

(65) Prior Publication Data

US 2023/0237026 A1 Jul. 27, 2023

Related U.S. Application Data

(63) Continuation of application No. 16/551,640, filed on Aug. 26, 2019, now Pat. No. 11,550,759, which is a
(Continued)

(51) Int. Cl.
| | |
|---|---|
| G06F 7/00 | (2006.01) |
| G06F 3/04842 | (2022.01) |
| G06F 16/00 | (2019.01) |
| G06F 16/182 | (2019.01) |
| H04L 9/40 | (2022.01) |
| H04L 67/1095 | (2022.01) |
| H04L 67/1097 | (2022.01) |

(52) U.S. Cl.
CPC ........ *G06F 16/182* (2019.01); *G06F 3/04842* (2013.01); *H04L 63/08* (2013.01); *H04L 63/083* (2013.01); *H04L 67/1095* (2013.01); *H04L 67/1097* (2013.01)

(58) Field of Classification Search
None
See application file for complete search history.

(56) References Cited

U.S. PATENT DOCUMENTS

| | | |
|---|---|---|
| 2004/0210591 A1 | 10/2004 | Hirschfeld et al. |
| 2006/0045245 A1 | 3/2006 | Aaron et al. |
| | (Continued) | |

FOREIGN PATENT DOCUMENTS

| | | |
|---|---|---|
| KR | 10-2012-0059637 | 6/2012 |
| WO | 2009-120595 | 10/2009 |

OTHER PUBLICATIONS

Mayer et al., "Third-Party Web Tracking: Policy and Technology," Proceedings of the 2012 IEEE Symposium on Security and Privacy, May 20-23, 2012, pp. 413-427.

*Primary Examiner* — Tuan A Pham
(74) *Attorney, Agent, or Firm* — Lowenstein Sandler LLP

(57) ABSTRACT

A method for saving a file stored on a third-party system to a cloud storage system includes receiving, at a cloud storage server of the cloud storage system, a save request from the third party system. The method further includes authenticating the save request, based at least in part on information identifying a user, creating a copy of the file at the cloud storage server, and associating the copy of the file with the user.

23 Claims, 6 Drawing Sheets

Related U.S. Application Data continuation of application No. 15/723,087, filed on Oct. 2, 2017, now Pat. No. 10,394,765, which is a continuation of application No. 15/066,501, filed on Mar. 10, 2016, now Pat. No. 9,781,210, which is a continuation of application No. 13/735,295, filed on Jan. 7, 2013, now Pat. No. 9,317,522.

(56) References Cited

U.S. PATENT DOCUMENTS

| | | |
|---|---|---|
| 2006/0047830 A1 | 3/2006 | Nair et al. |
| 2009/0120595 A1 | 5/2009 | Goodman et al. |
| 2010/0242121 A1 | 9/2010 | Johnson et al. |
| 2011/0047449 A1 | 2/2011 | Polakam et al. |
| 2011/0047463 A1 | 2/2011 | Shepherd et al. |
| 2011/0087690 A1 | 4/2011 | Cairns |
| 2011/0185406 A1 | 7/2011 | Hirson et al. |
| 2011/0246294 A1 | 10/2011 | Robb |
| 2011/0265147 A1 | 10/2011 | Liu |
| 2011/0320283 A1 | 12/2011 | Aaron et al. |
| 2012/0185701 A1 | 7/2012 | Balinsky et al. |
| 2012/0215820 A1 | 8/2012 | Ogasawara et al. |
| 2012/0233228 A1 | 9/2012 | Barton et al. |
| 2012/0311069 A1 | 12/2012 | Robbin et al. |
| 2012/0311081 A1 | 12/2012 | Robbin |
| 2013/0007813 A1 | 1/2013 | Baskaran et al. |
| 2013/0138810 A1* | 5/2013 | Binyamin ............. G06F 9/5072 709/225 |
| 2014/0108956 A1* | 4/2014 | Varenhorst .......... G06F 3/04842 715/748 |

* cited by examiner

SAVING FILES FROM THIRD-PARTY SYSTEMS DIRECTLY TO A CLOUD STORAGE SYSTEM

CROSS-REFERENCE TO RELATED APPLICATIONS

This application is a continuation application of co-pending U.S. patent application Ser. No. 16/551,640, filed Aug. 26, 2019, which is a continuation of U.S. patent application Ser. No. 15/723,087, filed Oct. 2, 2017, now issued as U.S. Pat. No. 10,394,765, which is a continuation application of U.S. patent application Ser. No. 15/066,501, filed Mar. 10, 2016, now issued as U.S. Pat. No. 9,781,210, which is a continuation application of U.S. patent application Ser. No. 13/735,295, filed on Jan. 7, 2013, now issued as U.S. Pat. No. 9,317,522, each of which is incorporated herein by reference.

BACKGROUND

Cloud storage systems provide users with the ability to store electronic documents and other files on a remote network rather than on a local computer. This allows users the ability to access the remotely stored files from any device that is capable of connecting with the remote network, for example using a web browser over an Internet connection. Cloud storage systems also provide users with a large amount of memory to store files so that users are not limited by the memory capacity of the devices that they own. Users typically log into an account on the cloud storage system using a username and password. The cloud storage system provides a user interface for users to view, edit, and manage files stored on the system. Cloud storage systems also provide users the ability to share files with other users. Cloud computing services may work in tandem with cloud storage systems to allow users to create and edit files and allow collaboration between users on the same tile.

Users have access to a wide variety of services and applications provided by third-party websites over the Internet. These third-party applications or services may provide files that a user may wish to download or copy, either to the user's client computer or to a cloud storage system. In order to save the file onto the cloud storage system, an intermediate device or service is usually necessary. For example, the user may save the file onto the user's client computer before uploading the file from the client computer to the cloud storage system. Alternatively, intermediary online service providers may allow a user to input a uniform resource locator (URL) link to the file stored on the third-party system. The intermediary online service downloads the file from the third-party system and saves it onto the cloud storage system.

SUMMARY

The systems and methods described herein provide tor a way to save files stored on a third-party system directly to a cloud storage system without the need for an intermediary device such as a client computer or online service. The cloud storage system and the third-party system communicate directly with each other to complete the transaction. Once the file transfer has been initiated the client computer may be disconnected from the Internet or even shut down without affecting the file transfer. The cloud storage system provides an embeddable user interface (UI) that third-party systems may embed on their websites and are loaded onto a user's client computer when the user visits the website. The embeddable UI gives a user the option to save one or more files directly from the third-party system to the user's account on the cloud storage system. When the option is selected, a window will appear where the user may enter a login and password for the cloud storage system or another method of user authentication. The embeddable UI loaded on the client computer then sends a save request to the cloud storage system, which authenticates the save request by the user and downloads the files directly from the third-party system. Alternatively, the third-party system may save a master file on the cloud storage system, where it is associated with a document ID. When a user chooses to save the file into their cloud storage system account, the client computer sends a save request to the cloud storage system, which includes the document ID of the file. The cloud storage system creates a copy of the file from the master copy saved by the third-party system and associates the copy with the user's account.

One aspect described herein discloses a method for saving a file stored on a third-party system directly to a cloud storage system. The method includes providing a third-party system with an embeddable user interface for saving a plurality of files stored on the third-party system to a server hosting the cloud storage system. The method further includes receiving at the server a save request from a user on a client computer using the embeddable user interface to select the first file to be stored on the server, where the save request comprises information identifying a first file in the plurality of files. The method further includes authenticating the save request, downloading the first file from the third-party system directly to the server using the information identifying the first file, and saving the first file on the server.

Another aspect described herein discloses a method for saving a tile stored on a third-party system directly to a cloud storage system. The method includes providing a third-party system with an embeddable user interface tor saving a plurality of files stored on the third-party system to a server hosting the cloud storage system, and storing, at the server, a master copy of a first file in the plurality of files sent from the third-party system, where the master copy is associated with a document ID. The method further includes receiving at the server a save request from a user on a client computer using the embeddable user interface to select the first file to be stored on the server, where the save request comprises the document ID. The method further includes authenticating the save request, creating a copy of the master copy on the server, and associating the copy of the master copy with the user.

Another aspect described herein discloses a system for saving a file stored on a third-party system directly to a cloud storage system. The system includes a server configured to communicate with a plurality of client computers using a communication connection and provide a plurality of third-party systems with an embeddable user interface for saving a plurality of files stored on the plurality of third-party systems to a server hosting the cloud storage system. The server is further configured to receive at the server a first save request from a user on a first client computer in the plurality of client computers using the embeddable user interface on a first third-party system in the plurality of the third-party systems to select a first file in the plurality of files to be stored on the server, wherein the first save request comprises information identifying a first file in the plurality of files. The server is further configured to authenticate the first save request, download the first file from the first third-party system directly to the server using the information identifying the file, and save the first file on the server.

BRIEF DESCRIPTION OF THE DRAWINGS

The methods and systems may be better understood from the following illustrative description with reference to the following drawings in which.

DETAILED DESCRIPTION

Figure 1:
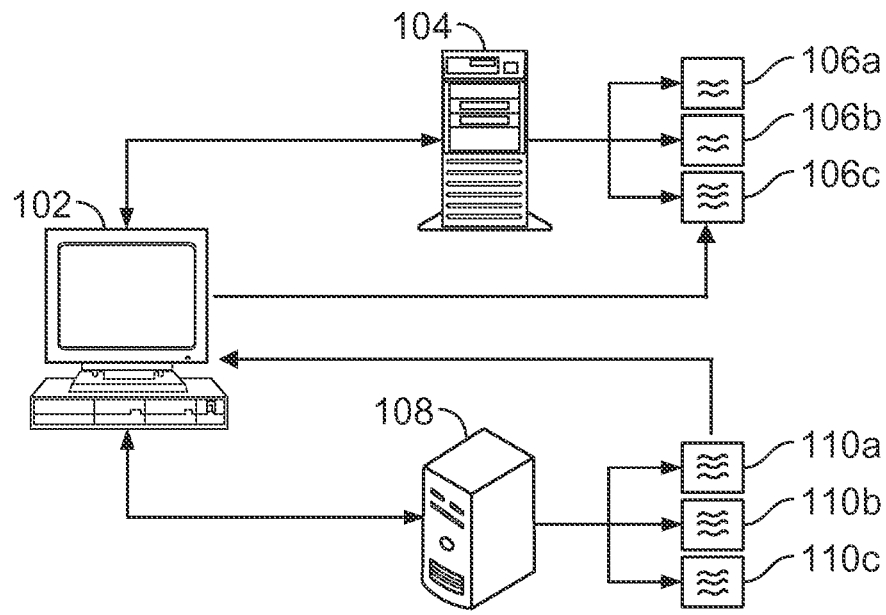
FIG. 1 shows a client computer in communication with a cloud storage system and a third-party system in accordance with an implementation as described herein.

To provide an overall understanding of the systems and methods described herein, certain illustrative embodiments will now be described, including systems and methods for saving a file stored on a third-party system directly to a cloud storage system. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server or system as used in this description may be a single computing device or multiple computing devices working collectively and in which the storage of data and the execution of functions are spread out amongst the various computing devices.

Aspects of the systems and methods described herein provide a cloud storage system capable of storing a file obtained directly from a third-party system. Many third-party services and applications available on the Internet provide users with various files that the users may download. User may wish to store these files on a cloud storage system rather than on a local client computer. To provide a way for files to be transferred directly from the third-party system to the cloud storage system without the use of intermediary services, the cloud storage system provides an embeddable UI that third-party systems may embed on their websites. The embeddable UI gives a user the option to save a file directly from the third-party system to the user's account on the cloud storage system. The embeddable UI is loaded on the user's client computer when the user visits the third-party system website. When the option to save directly to the cloud storage system is selected, a window will appear where the user may enter a login and password for the cloud storage system or another method of user authentication. The embeddable UI loaded on the client computer sends a save request to the cloud storage system, which includes a link to the file or other information identifying the file. The save request may also include information about the user and the third-party system, such as authentication information about the user for the third-party system. The cloud storage system authenticates the save request and downloads the file directly from the third-party system. Alternatively, the third-party system may save a master file on the cloud storage system, where it is associated with a unique document ID and shared with the third-party system. When a user chooses to save the file into their cloud storage system account, the user's client computer sends a save request to the cloud storage system which includes the document ID of the tile. The cloud storage system creates a copy of the file from the master copy saved by the third-party system and associates the copy with the user's account.

A cloud storage system may include one or more servers for providing cloud storage services to users on client computers. For example, a cloud storage system may include a number of data servers for storing a number of files for users of the cloud storage system. The Cloud storage system may store a large number of such files in total for a number of users. Files that are stored in the cloud storage system may include word processing documents, spreadsheets, presentations, pictures, music, videos, and a variety of other file formats. A user may use a client computer to log into the cloud storage system using a username and password or other login mechanism and access data files owned by the user.

Users may also access a number of third-party systems which provide services or applications for the user. Third-party services may include any commercial or publicly available service offered on the Internet such as word processing applications, photo and video storing and sharing services, spreadsheet applications, graphic design services, presentation applications, database applications, gaming and entertainment services, music services, e-mail services, cloud storage services, banking and finance services, utility and billing services, and a variety of other categories. Third-party systems may allow users to view, create, store, copy, or download files stored on its system. A third-party system may include one or more computing devices, such as servers, to provide the third-party service. The third-party system may store any number of files for a number of users, such as word processing documents, spreadsheets, presentations, music, photos, videos, and the like.

A user may wish to copy a file stored on a third-party system to the user's account on a cloud storage system. Normally, this process includes the participation of an intermediary device such as the client computer. FIG. 1 shows an example of how a client computer is used to copy a file from a third-party system to a cloud storage system. System 100 includes a client computer 102 capable of communicating with cloud storage system 104 and a third-party system 108. Client computer 102 may be a desktop computer, laptop computer, tablet, smart phone, or any other type of electronic device that may connect with a remote network. The remote network connection may be a wired or wireless Internet connection, local area network (LAN), wide area network (WAN), Ethernet, or any other type of known network connection. Cloud storage system 104 may include one or more servers for providing cloud storage services to a user on client computer 102. Cloud storage system 104 may include a number of data servers for storing a number of files, including files 106a and 106b, for users of the cloud storage system.

System 100 also includes third-party system 108 which provides services or applications for the user. Third-party system 108 stores files 110a through 110c. If a user wanted to save a file stored on third-party system 108, such as file 110a, to cloud storage system 104, the user first downloads a copy of file 110a to client computer 102. The user then uploads the copy to cloud storage system 104, stored as file 106c. Client computer 102 may have web browser extensions that aid the user in this process, but a copy of file 110a is still downloaded to client computer 102 before being uploaded to cloud storage system 104. Thus an intermediary device, the client computer, is involved in the process of transferring a copy of file 110a from third-party system 108 to cloud storage system 104.

Figure 2:
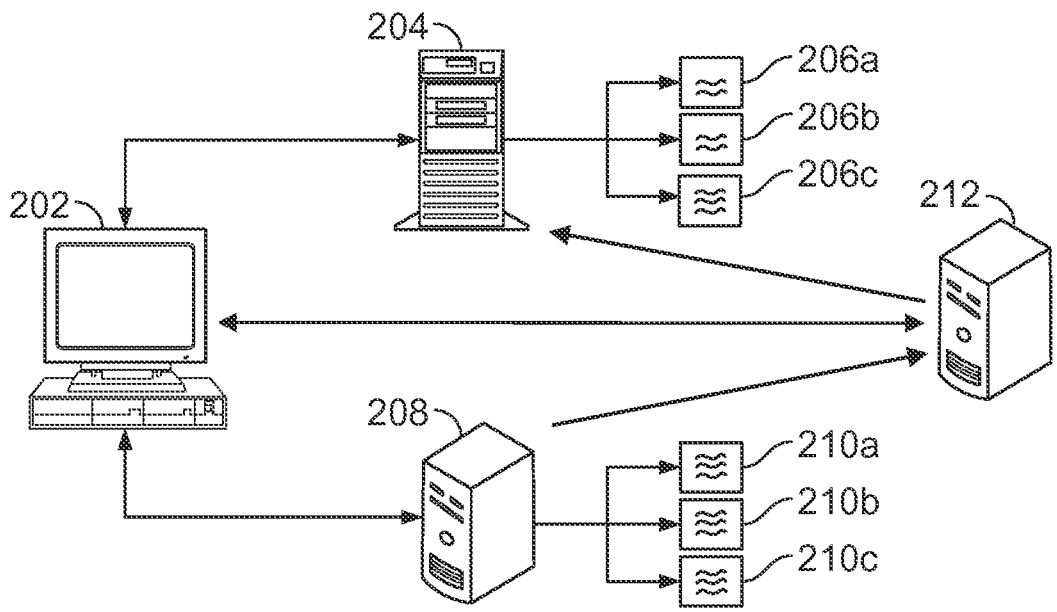
FIG. 2 shows a client computer in communication with a cloud storage system, a third-party system, and an intermediary online service provider in accordance with an implementation as described herein.

Intermediary online service providers may be used to aid users in saving files from a third-party system to a cloud storage system. System 200 in FIG. 2 illustrates how such an intermediary service provider operates. System 200 includes a client computer 202 capable of communicating with cloud storage system 204 and a third-party system 208, similar to system 100 in FIG. 1. Third-party system 208 stores files 210a through 210c. The user also stores files on cloud storage system 204, such as files 206a and 206b. Client computer 202 also communicates with intermediary service provider 212, which may be a web-based service that a user may access through a web browser. Intermediary service provider 212 may provide a user interface where a user may enter the URL of a file stored on third-party system 208, such as file 210a. The user may also enter authentication credentials to intermediary service provider 212, such as the user's login and password for cloud storage system 204. Intermediary service provider 212 then downloads a copy of file 210a to the service provider's servers and then, using the user's authentication credentials, uploads the copy to cloud storage system 204 as file 206c. Similar to the situation in system 100 of FIG. 1, system 200 also involves the use of an intermediary device or service to transfer a file from a third-party system to a cloud storage system.

Figure 3:
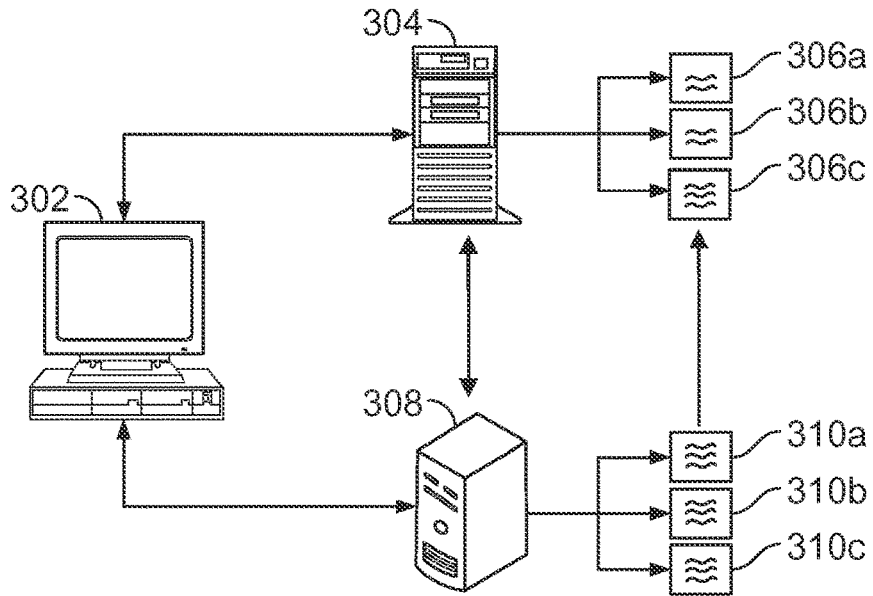
FIG. 3 shows a client computer in communication with a cloud storage system capable of storing files obtained directly from a third-party system in accordance with an implementation as described herein.
Figure 4:
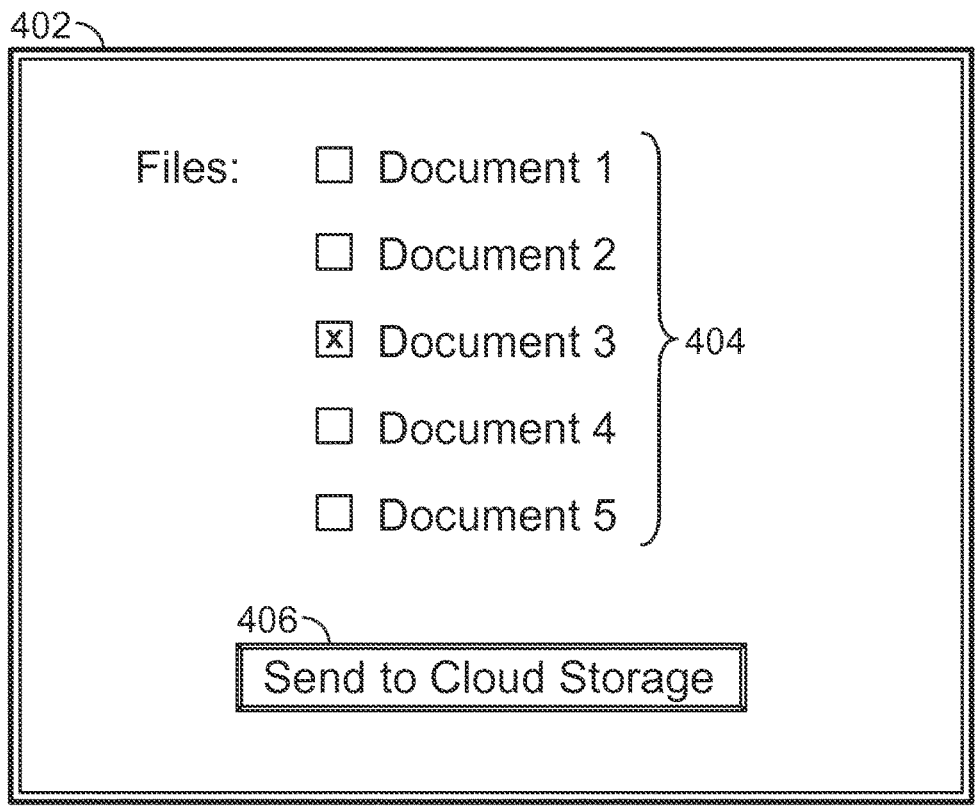
FIG. 4 shows a web page with an embeddable user interface for saving files from a third-party system directly to a cloud storage system in accordance with an implementation as described herein.

The systems and methods described herein avoid the use of an intermediary service to transfer files from a third-party system to a cloud storage system. Rather, a user may initiate a file transfer directly between the third-party system and cloud storage system, unlike the arrangements shown in FIGS. 1 and 2. The user does not need to use an intermediary service provider to complete the transfer. Also, after the file transfer has been initiated the user's client computer may be disconnected from the Internet or even shut down without affecting the file transfer. An example of such a system is shown in FIG. 3. System 300 illustrates a cloud storage system that may directly obtain files stored on a third-party system. System 300 includes a client computer 302 capable of communicating with cloud storage system 304 and a third-party system 308, similar to system 100 in FIG. 1. Third-party system 308 stores files 310a through 310c. The user also stores files on cloud storage system 304, such as files 306a and 306b. Cloud storage system 304 provides an embeddable UI that third-party system 308 may incorporate into its website. For example, third-party system 308 may download a software development kit from cloud storage system 304 that includes the embeddable UI. The embeddable UI provides users with the option to save a tile stored on third-party system 308 directly to cloud storage system 304. Javascript or any other known web programming language may be used to encode the embeddable UI. For example, the embeddable UI may include one or more buttons for saving files 310a through 310c to cloud storage system 304. The embeddable UI may be made available to the user through a web page controlled by third-party system 308. For example, when a user visits the web page with the embeddable UI, a copy of the embeddable UI is loaded on the user's client computer (e.g. through a web browser). An example of a third-party system web page for providing the embeddable UI is shown in FIG. 4. Web page 400 includes a window 402, which may be a web browser window that displays one or more files 404 for downloading. The user may choose one or more files 404 to download directly to a cloud storage system, such as cloud storage system 304 in FIG. 3. Web page 400 also includes a button 406 which when selected initiates the process for downloading the selected files to the cloud storage system. Alternatively, each file may be associated with a button or link that initiates the download to the cloud storage system. The layout of web page 400 is not limited to what is illustrated in FIG. 4 but may include any web page configuration.

Figure 5:
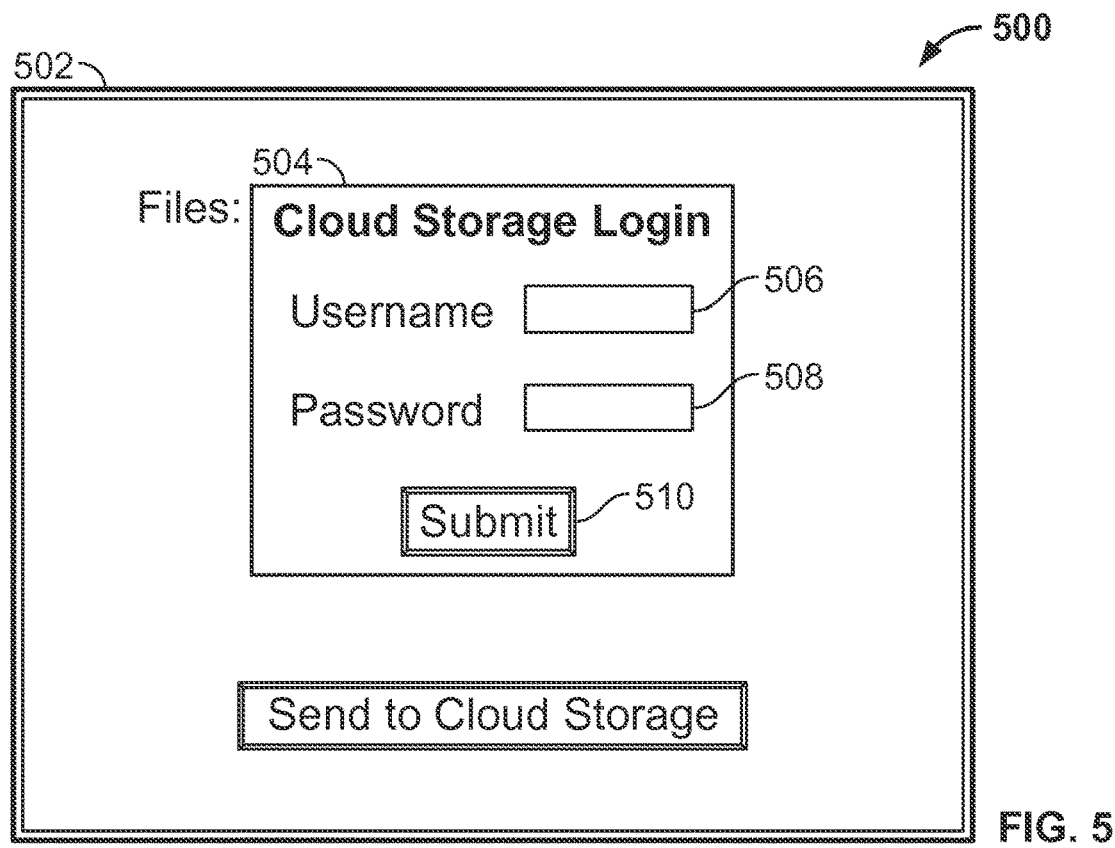
FIG. 5 shows an embeddable user interface display for saving files from a third-party system directly to a cloud storage system in accordance with an implementation as described herein.

Once the user makes a selection of files to save directly to the cloud storage system, for example by selecting button 406 in web page 400, an embeddable UI is initiated that continues the process. An example of an embeddable UI displayed by a third-party system is shown in FIG. 5. Web page 502 controlled by the third-party system includes an embeddable UI window 504, which may be a pop-up window frame that appears when a user chooses to save a file stored on the third-party system directly to the cloud storage system. Alternatively, embeddable UI window 504 may be an in-frame window that appears on top of web page 502. Embeddable UI window 504 may include username field 506 and password field 508, in which the user enters his or her login information for the cloud storage system. The user selects submit button 510 to submit this information to the cloud storage system. Alternatively, if the user's web browser stores a cookie that contains the user's username and password information for the cloud storage system, the embeddable UI may obtain the authentication information from the cookie and there is no need to show a user authentication window. If the user has multiple accounts with the cloud storage system, embeddable UI window 504 may give the user an option of which account to use. The layout of embeddable UI window 504 is not limited to what is illustrated in FIG. 5 but may include any web page configuration. Embeddable UI window 504 may also ask for the user's authentication information for the third-party system, for example if the file to be transferred is only available to registered users of the third-party system. The third-party system authentication information may also be obtained from browser cookies.

Figure 6:
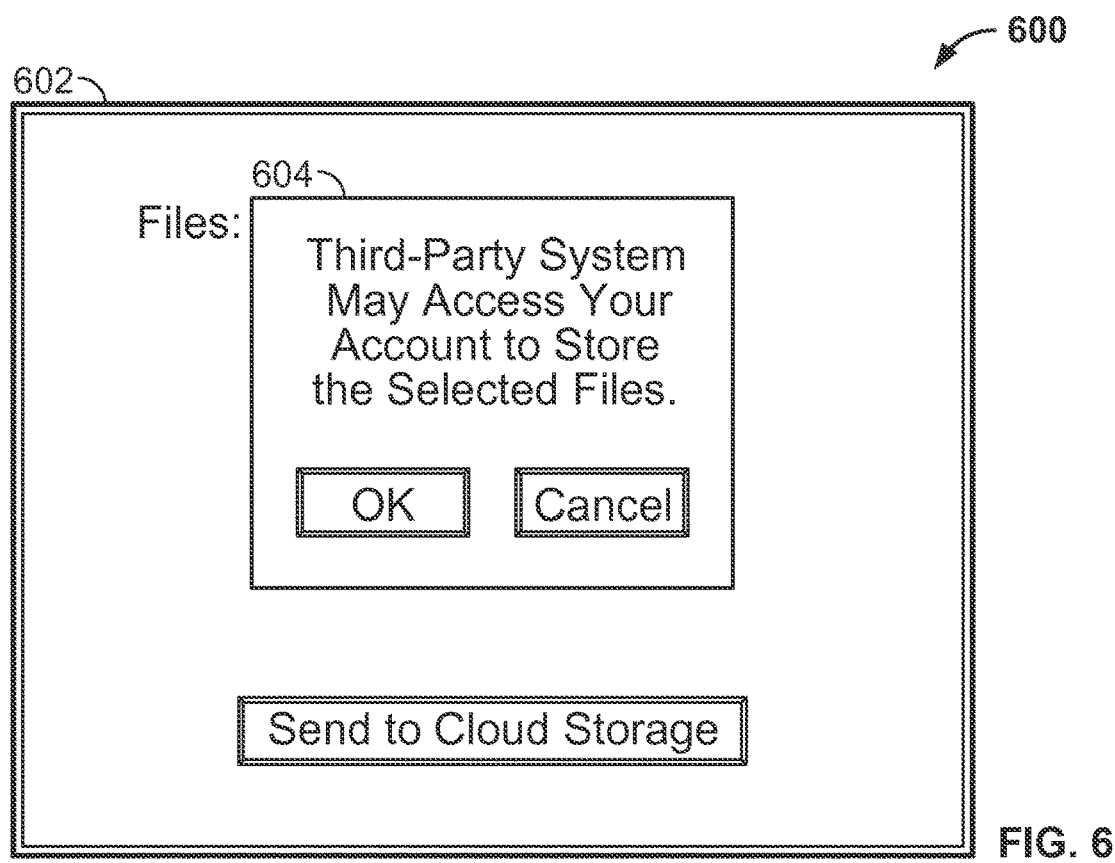
FIG. 6 shows another embeddable user interface display for saving files from a third-party system directly to a cloud storage system in accordance with an implementation as described herein.

Alternatively, authorization tokens may be used as a form of user authentication. Third-party system 308 in FIG. 3 may have registered its application with cloud storage system 304. For example, cloud storage system may provide an application programming interface (API) for third-party system 308 to register itself with cloud storage system 304. Cloud storage system 304 assigns an application ID to third-party system 308. After third-party system 308 is registered, users may create authorization tokens, which allow third-party system 308 automatic access to the user's account on cloud storage system 304. For example, the first time the user chooses to save a file stored on third-party system 308 to cloud storage system 304, the embeddable UI provides users with the option to grant third-party system 308 an authorization token for accessing the user's account. An example of such an embeddable UI is shown in FIG. 6. Web page 602 is controlled by the third-party system and includes an embeddable UI window 604, which may be a pop-up window frame that appears when a user chooses to save a file stored on the third-party system directly to the cloud storage system. Alternatively, embeddable UI window 604 may be an in-frame window that appears on top of web page 602. Embeddable UI window 604 shows a message that warns the user that the third-party system may access the user's account to store the selected files. Embeddable UI window 604 gives the user the option to accept or reject giving the third-party system access to the user's account. If the user accepts the option, the third-party system may generate an authorization token associated with the user. Embeddable UI window 604 may allow the user to specify the level of access or a time limit that the authorization token is valid. After the authorization token is created, the user may save any file stored on the third-party system directly to the cloud storage system without any further user authentication step. The layout of embeddable UI window 604 is not limited to what is illustrated in FIG. 6 but may include any web page configuration.

Once user authentication has finished, the embeddable UI loaded on client computer 302 in FIG. 3 sends a save request to cloud storage system 304. The save request may include user authentication information for the cloud storage system, such as a login and password or authorization token, user authentication information for the third-party system, and application authentication information, such as an application ID. The save request also includes information identifying the tile to be saved to the cloud storage system, such as a URL for file 310a. If file 310a is under restricted access, for example if the third-party system is a banking website, third-party system 308 may provide a one-time use URL where authorization information may be embedded in the URL The URL may also be valid for a limited amount of time. Cloud storage system 304 authenticates the user and application information received from client computer 302 to identify the third-party system and the user that requested the storage of file 310a. Cloud storage system 304 then downloads a copy of file 310a directly from third-party system 308 using the URL, shown as file 306c. Cloud storage system 304 associates file 306c with the user.

Some third-party systems may wish to store a master copy of a file on the cloud storage system. Instead of transferring the file between the third-party system and cloud storage system each time a user initiates the file transfer, the master copy of the file may simply be copied and stored in the user's account on the cloud storage system. For example, journals or magazines may store certain articles on the cloud storage system and offer their subscribers the ability to save a copy of the article to the subscribers' accounts on the cloud storage system. Files that are stored on the server by a third-party system may be completed files that are not editable by the user. In this scenario, third-party system 308 has pre-stored a master copy of file 310a with cloud storage system 304, where it is associated with a document ID. When a user chooses to save file 310a to cloud storage system 304, client computer 302 includes the document ID of file 310a in its save request to cloud storage system 304. Cloud storage system 304 authenticates the save request as described above, but then creates a copy of the master file, depicted as file 306c, stored on cloud storage system 304 rather than download the file from third-party system 308. Cloud storage system 304 associates copied file 306c with the user. This saves bandwidth by only having to transfer file 310a once to cloud storage system 304. The transfer of files between third-party system 308 and cloud storage system 304 occurs independently of client computer 302. After the file transfer has been initiated, client computer 302 may continue navigating the Internet, or may disconnect from the Internet or be shut down without affecting the transfer of the file. The transfer does not require the involvement of client computer 302 or any other intermediary service, for example for temporarily storing a copy of file 310a. Thus FIG. 3 illustrates a system for saving a file stored on a third-party system directly to a cloud storage system.

Cloud storage system 304 may also monitor the download of files from third-party system 308. This may include monitoring the amount of data, as measured in kilobytes per second or other metrics, that are transferred from third-party system 308 to cloud storage system 304 by one or more users. If the amount of data transferred from third-party system 308 by one user exceeds a certain threshold, cloud storage system 304 may reduce, or throttle, the number of downloaded files or the speed of the download of one or more files for that user. This prevents certain users from overloading third-party system 308 with download requests and possibly causing a denial of service error on third-party system 308.

Figure 7:
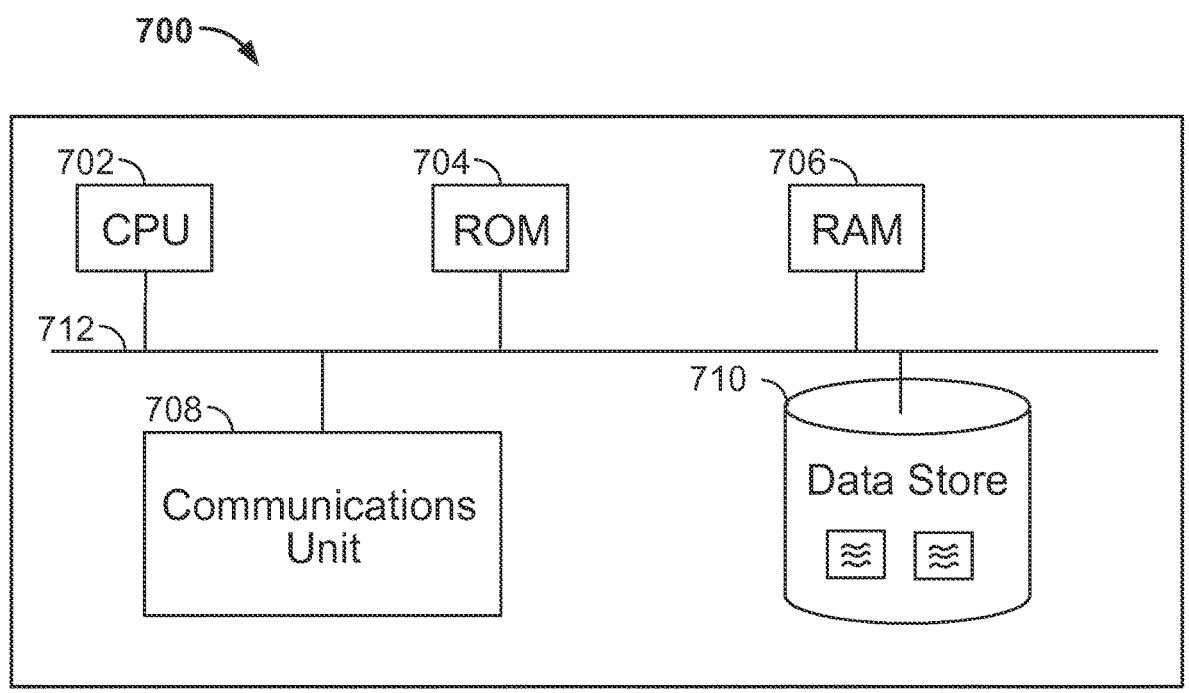
FIG. 7 shows the components of a server providing a cloud storage system capable of storing files obtained directly from a third-party system in accordance with an implementation as described herein.

A cloud storage system for directly obtaining files stored on a third-party system is now described in more detail. Server 700 in FIG. 7 shows an example of a server for use in a cloud storage system. A cloud storage system may include a number of servers that collectively provide the cloud storage service. Server 700 includes a central processing unit (CPU) 302, read only memory (ROM) 704, random access memory (RAM) 706, communications unit 708, data store 710, and bus 712. Server 700 may have additional components that are not illustrated in FIG. 7. Bus 712 allows the various components of server 700 to communicate with each other. Communications unit 708 allows the server 700 to communicate with other devices, such as client computers, other servers in the cloud storage system, or third-party systems. Data store 710 may store, among other things, data files belonging to users of the cloud storage system. Data store 710 may also store an embeddable UI software package that may be downloaded by third-party systems. Users connect with server 700 through communications unit 708 to access their files stored in data store 710. Server 700 also downloads copies of files directly from third-party systems through communications unit 708.

Data store 710 for providing cloud storage services may be implemented using non-transitory computer-readable media. In addition, other programs executing on server 700 may be stored on non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and readable, once-writable, or rewriteable CD-ROM and DVD-ROM disks.

Figure 8:
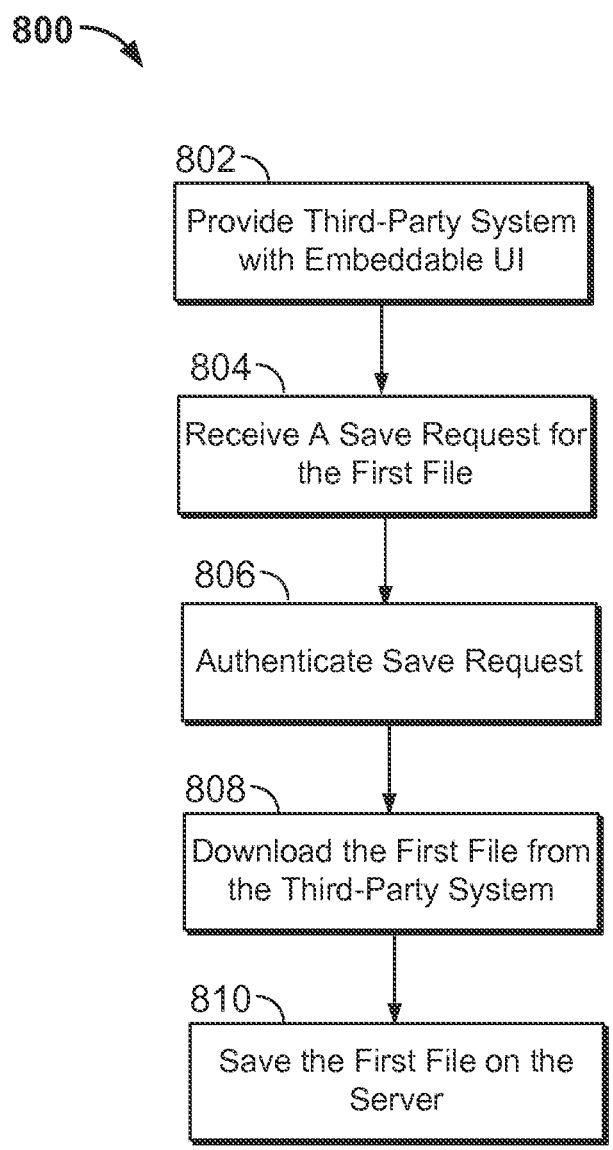
FIG. 8 shows a method for saving a file stored on a third-party system directly to a cloud storage system in accordance with an implementation as described herein.

Methods for saving a file stored on a third-party system directly to a cloud storage system are now described. Method 800 in FIG. 8 includes providing a third-party system with an embeddable user interface for saving a plurality of files stored on the third-party system to a server hosting the cloud storage system. The method further includes receiving at the server a save request from a user on a client computer using the embeddable user interface to select the first file to be stored on the server, where the save request comprises information identifying a first file in the plurality of files. The method further includes authenticating the save request, downloading the first file from the third-party system directly to the server using the information identifying the first file, and saving the first file on the server. Method 800 may be performed on a network system that includes a client computer, one or more servers for providing cloud storage services, and one or more third-party systems. An example of a system on which the method may be performed is shown in FIG. 3.

Method 800 begins when a server that hosts a cloud storage service provides an embeddable user interface for a third-party system, illustrated at 802. The embeddable UI may be made available by the server for download by third-party systems. The third-party system embeds the UI on web pages controlled by the third-party system. The embeddable UI provides an interface for users to download one or more files stored on the third-party system to the server directly. The embeddable UI may be coded using Javascript or any other known web programming language. Examples of embeddable UIs that may be used by third-party systems are illustrated in FIGS. 5 and 6.

After the third-party system embeds the embeddable UI on one or more of its web pages, a user on a client computer visits the web page and loads a copy of the embeddable UI on the client computer (e.g. through a web browser). The user utilizes the embeddable UI to select one or more files stored on the third-party system to be stored on the server. The client computer then sends the server a save request, illustrated at 804. The save request includes information identifying the one or more files to be stored on the server. This information may be URLs for each file. For restricted access files, the URLs may be a one-time-use URL with authentication information embedded in the URL. The URL may also expire within a certain amount of time. The save request may also include information identifying the user, such as username and password information for the user's account on the cloud storage service. This information may be obtained from the embeddable UI, which may ask the user for the username and password. The information may also be obtained from the web browser cache of the client computer. The save request may also include information identifying the third-party system, such as an application ID or an authorization token.

After the server receives the save request from the client computer, the server authenticates the save request, illustrated at 806. Authentication may include verifying the user's login credentials to the server and the third-party system, verifying the application ID presented by the third-party system, or verifying that the authorization token presented by the third-party system gives the third-party system access rights to save files to the user's account. After the save request has been authenticated, the server downloads the one or more files embodied by the save request from the third-party system, illustrated at 808. For example, the server may locate the files using the URLs provided in the save request. The server downloads the files directly from the third-party system without requiring the use of the client computer or any other intermediary service. The server may monitor the amount of data that the user is downloading from the third-party system. If the amount of data exceeds a certain threshold, the server may reduce the download speed or the number of files downloaded by the user from the third-party system. This helps prevent overloading the third-party system with download requests. When the server completes the download of the files, the server saves the files in its cloud storage service and associates the files with the user, illustrated at 810. Thus method 800 provides a way of saving a file stored on a third-party system directly to a cloud storage system.

Figure 9:
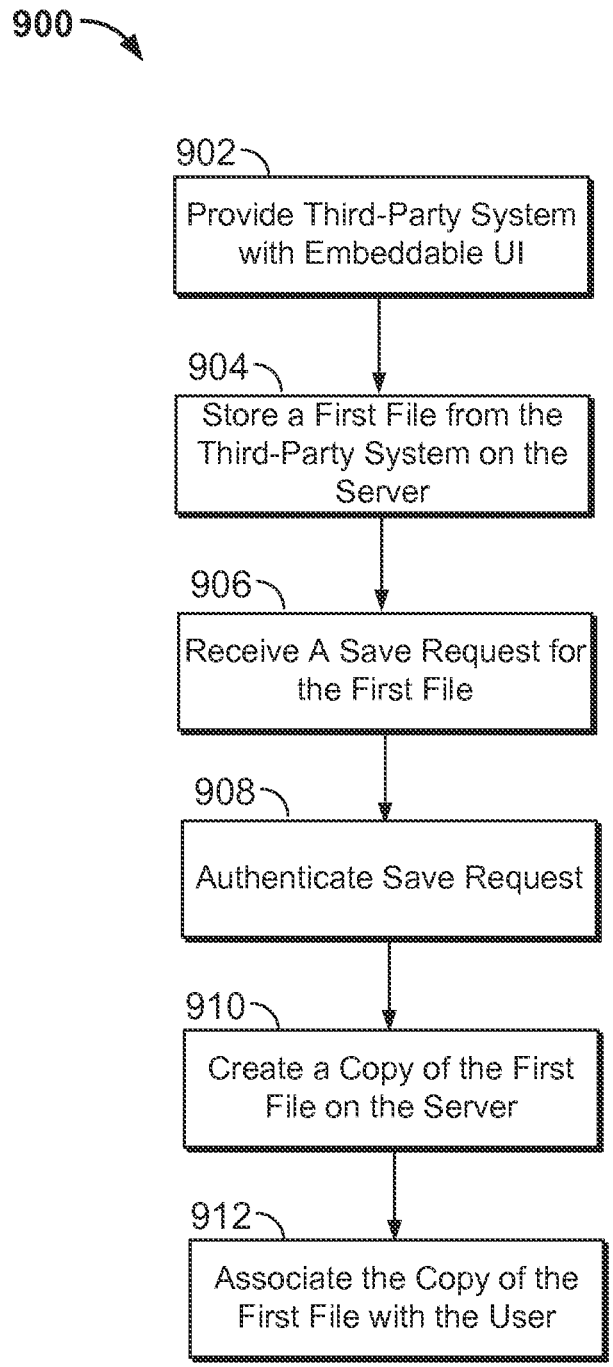
FIG. 9 shows another method for saving a file stored on a third-party system directly to a cloud storage system in accordance with an implementation as described herein.

Another method for saving a file stored on a third-party system directly to a cloud storage system is shown in FIG. 9, where a master copy of one or more files is stored on the cloud storage system. When a user chooses to save a file offered by the third-party system to the cloud storage system, a copy of the master file is made and stored in the user's account. Method 900 includes providing a third-party system with an embeddable user interface for saving a plurality of files stored on the third-party system to a server, and storing, at the server, a master copy of a first file in the plurality of files sent from the third-party system, where the master copy is associated with a document ID. The method further includes receiving at the server a save request from a user on a client computer using the embeddable user interface to select the first file to be stored on the server, where the save request comprises the document !D. The method further includes authenticating the save request, creating a copy of the master copy on the server, and associating the copy of the master copy with the user. Method 900 may be performed on a network system that includes a client computer, one or more servers for providing cloud storage services, and one or more third-party systems. An example of a system on which the method may be performed is shown in FIG. 3.

Method 900 begins when a server that manages a cloud storage service provides an embeddable user interface for a third-party system, illustrated at 902. The embeddable UI may be made available by the server for download by third-party systems. The third-party system embeds the UI on web pages controlled by the third-party system. The embeddable UI provides an interface for users to download one or more files stored on the third-party system to the server directly. The embeddable UI may be coded using Javascript or any other known web programming language. Examples of embeddable UIs that may be used by third-party systems are illustrated in FIGS. 5 and 6.

After the third-party system embeds the embeddable UI on one or more of its web pages, the third-party system stores one or more copies of its files on the server, illustrated at 904. The administrators of the third-party system may choose certain files to be stored on the system. The server downloads the files directly from the third-party system without assistance from any intermediary services and without any user involvement. The files stored on the server are designated as the master copies of the files on the server. These files may also be available to users through the third-party system, or the third-party system may wish to have only the server store the publicly available copies of the files. The server stores the files and associates each master copy of a file with a document ID, which is sent to the third-party system.

After the third-party system stores one or more files on the server, a user on a client computer visits the web page and loads a copy of the embeddable UI on the client computer (e.g. through a web browser). The user utilizes the embeddable UI to select one or more files stored on the third-party system to be stored on the server. The client computer then sends the server a save request, illustrated at 906. The save request includes information identifying the one or more files to be stored on the server. This information includes the document ID for the files selected by the user. The save request may also include information identifying the user, such as username and password information for the user's account on the cloud storage service. This information may be obtained from the embeddable UI, which may ask the user for the username and password. The information may also be obtained from the web browser cache of the client computer. The save request may also include information identifying the third-party system, such as an application ID or an authorization token.

After the server receives the save request from the client computer, the server authenticates the save request, illustrated at 908. Authentication may include verifying the user's login credentials to the server and the third-party system, verifying the application ID presented by the third-party system, or verifying that the authorization token presented by the third-party system gives the third-party system access rights to save files to the user's account After the save request has been authenticated, the server creates a copy of each of the selected files from the master copies, illustrated at 910. The server then associates the copy of the master copy with the user, illustrated at 912. By keeping a master copy of the files on the server and creating copies of the files when a user makes a save request, the bandwidth required is reduced. The third-party system only sends the server one copy of the file, and it is replicated internally at the server. Thus method 900 provides a way of saving a file stored on a third-party system directly to a cloud storage system. Methods 800 and 900 may occur at the same time. For example, a user may select a number of files provided by a third-party system to be stored on a server, where some of the files already have master copies stored on the server but other files do not and need to be transferred to the server.

It will be apparent that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A method for saving a file stored on a third-party system directly to a cloud storage system, the method comprising:
   receiving, at a cloud storage server of the cloud storage system, a save request from the third party system,
   wherein the save request is generated in response to a user selecting a save-to-cloud user interface element embedded in a user interface that is provided by the third-party system and presented on a client computer, providing information identifying the user, and selecting the file from a plurality of files that are stored on the third-party system and are presented in the user interface provided by the third-party system for selection by the user, the file to be saved directly from the third-party system to the cloud storage server in association with a user account of the user on the cloud storage system, the cloud storage server storing a plurality of other files of the user,
   wherein the save request comprises a file identifier of the file, and
   wherein the information identifying the user is provided to authenticate the user and allow access to the user account of the user on the cloud storage system without use of the client computer as intermediary service;
   adding the file to the plurality of other files stored at the cloud storage server in association with the user account of the user on the cloud storage system and provided for collaborative editing between the user and other users of the cloud storage system, wherein adding the file comprises:
   uploading the file to the cloud storage server; and
   associating the file with the user account of the user on the cloud storage system; and
   allowing the user to share the file associated with the user account of the user on the cloud storage system with other users of the cloud storage system.

2. The method of claim 1, wherein the file identifier comprises a URL.

3. The method of claim 1, wherein the information identifying the user comprises the user's username and password information for the cloud storage system.

4. The method of claim 1, wherein the information identifying the user comprises the user's username and password information for the third-party system.

5. The method of claim 1, wherein the save request further comprises an authorization token associating the user with the third-party system.

6. The method of claim 1, further comprising:
   recording an amount of data provided by the third-party system for storage on the cloud storage server for the user, the data provided by the third-party system for storage on the cloud storage comprising the file.

7. The method of claim 6, wherein recording the amount of data provided by the third-party system for storage on the cloud storage server for the user comprises:
   monitoring the amount of data downloaded from the third-party system to the cloud storage server for the user.

8. The method of claim 7, further comprising:
   limiting a number of files downloaded from the third-party system to the cloud storage server depending on a threshold.

9. The method of claim 7, further comprising:
   limiting a speed with which files are downloaded from the third-party system to cloud storage server depending on a threshold.

10. The method of claim 1, wherein the third-party system stores a master copy of the file, and the file uploaded to the cloud storage server is a copy of the master copy of the file.

11. A system for saving a file stored on a third-party system directly to a cloud storage system, the system comprising:
    a memory; and
    a processing device, coupled to the memory, to perform operations comprising:
    receiving, at a cloud storage server of the cloud storage system, a save request from the third party system,
    wherein the save request is generated in response to a user selecting a save-to-cloud user interface element embedded in a user interface that is provided by the third-party system and presented on a client computer, providing information identifying the user, and selecting the file from a plurality of files that are stored on the third-party system and are presented in the user interface provided by the third-party system for selection by the user, the file to be saved directly from the third-party system to the cloud storage server in association with a user account of the user on the cloud storage system, the cloud storage server storing a plurality of other files of the user, wherein the save request comprises a file identifier of the file, and wherein the information identifying the user is provided to authenticate the user and allow access to the user account of the user on the cloud storage system without use of the client computer as intermediary service;

adding the file to the plurality of other files stored at the cloud storage server in association with the user account of the user on the cloud storage system and provided for collaborative editing between the user and other users of the cloud storage system, wherein adding the file comprises:
uploading the file to the cloud storage server; and
associating the file with the user account of the user on the cloud storage system; and allowing the user to share the file associated with the user account of the user on the cloud storage system with other users of the cloud storage system.

12. The system of claim 11, wherein the file identifier comprises a URL.

13. The system of claim 11, wherein the information identifying the user comprises the user's username and password information for the cloud storage system.

14. The system of claim 11, wherein the information identifying the user comprises the user's username and password information for the third-party system.

15. The system of claim 11, wherein the save request further comprises an authorization token associating the user with the third-party system.

16. The system of claim 11, the operations further comprising:
recording an amount of data provided by the third-party system for storage on the cloud storage server for the user, the data provided by the third-party system for storage on the cloud storage comprising the file.

17. The system of claim 16, wherein recording the amount of data provided by the third-party system for storage on the cloud storage server for the user comprises:
monitoring the amount of data downloaded from the third-party system to the cloud storage server for the user.

18. The system of claim 17, the operations further comprising:
limiting a number of files downloaded from the third-party system to the cloud storage server depending on a threshold.

19. The system of claim 17, the operations further comprising:
limiting a speed with which files are downloaded from the third-party system to cloud storage server depending on a threshold.

20. The system of claim 11, wherein the third-party system stores a master copy of the file, and the file uploaded to the cloud storage server is a copy of the master copy of the file.

21. A non-transitory computer-readable storage medium comprising instructions, which when executed by a processing device, cause the processing device to perform operations for saving a file stored on a third-party system directly to a cloud storage system, the operations comprising:
receiving, at a cloud storage server of the cloud storage system, a save request from the third party system,
wherein the save request is generated in response to a user selecting a save-to-cloud user interface element embedded in a user interface that is provided by the third-party system and presented on a client computer, providing information identifying the user, and selecting the file from a plurality of files that are stored on the third-party system and are presented in the user interface provided by the third-party system for selection by the user, the file to be saved directly from the third-party system to the cloud storage server in association with a user account of the user on the cloud storage system, the cloud storage server storing a plurality of other files of the user, wherein the save request comprises a file identifier of the file, and wherein the information identifying the user is provided to authenticate the user and allow access to the user account of the user on the cloud storage system without use of the client computer as intermediary service;

adding the file to the plurality of other files stored at the cloud storage server in association with the user account of the user on the cloud storage system and provided for collaborative editing between the user and other users of the cloud storage system, wherein adding the file comprises:
uploading the file to the cloud storage server; and
associating the file with the user account of the user on the cloud storage system; and allowing the user to share the file associated with the user account of the user on the cloud storage system with other users of the cloud storage system.

22. The non-transitory computer-readable storage medium of claim 21, wherein the file identifier comprises a URL.

23. The non-transitory computer-readable storage medium of claim 21, wherein the information identifying the user comprises the user's username and password information for the cloud storage system.

* * * * *